(12) United States Patent
Bertin et al.

(10) Patent No.: US 6,802,033 B1
(45) Date of Patent: Oct. 5, 2004

(54) LOW-POWER CRITICAL ERROR RATE COMMUNICATIONS CONTROLLER

(75) Inventors: Claude L. Bertin, South Burlington, VT (US); Alvar A. Dean, Essex Junction, VT (US); Kenneth J. Goodnow, Essex Junction, VT (US); Scott W. Gould, South Burlington, VT (US); Patrick E. Perry, Essex Junction, VT (US); Wilbur D. Pricer, Charlotte, VT (US); William R. Tonti, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,855

(22) Filed: Apr. 6, 1999

(51) Int. Cl.[7] .............................................. G06F 11/00
(52) U.S. Cl. ...................................... 714/704; 370/311
(58) Field of Search ................................ 714/718, 704, 714/708, 810; 455/17, 51, 69, 127, 522, 115, 13.4; 375/256, 224; 418/12; 370/311, 348, 350, 518, 527, 316; 342/353

(56) References Cited

U.S. PATENT DOCUMENTS

| | | | | |
|---|---|---|---|---|
| 4,261,054 A | * | 4/1981 | Scharla-Nielsen | 455/13.4 |
| 4,777,653 A | | 10/1988 | Bonnerot et al. | 455/69 |
| 4,955,038 A | | 9/1990 | Lee et al. | 375/256 |
| 5,155,590 A | | 10/1992 | Beyers, II et al. | 348/12 |
| 5,293,639 A | | 3/1994 | Wilson et al. | 455/17 |
| 5,371,734 A | * | 12/1994 | Fischer | 370/311 |
| 5,434,868 A | * | 7/1995 | Aichelmann, Jr. et al. | 714/718 |
| 5,471,655 A | * | 11/1995 | Kivari | 455/127 |
| 5,568,513 A | * | 10/1996 | Croft et al. | 375/224 |
| 5,606,725 A | * | 2/1997 | Hart | 455/5.1 |
| 5,977,886 A | * | 11/1999 | Barile et al. | 341/20 |
| 6,182,264 B1 | * | 1/2001 | Ott | 714/774 |
| 6,208,873 B1 | * | 3/2001 | Black et al. | 455/522 |
| 6,272,355 B1 | * | 8/2001 | Lokio | 455/522 |

OTHER PUBLICATIONS

Esmailzadeh, R. et al.(Time division transmission of direct sequence spread spectrum signals in multipath channels (Abstract); IEEE, Jun. 8–10, 1994).*

Yun, L.C., et al.(Variable quality of service in CDMA systems by statistical power control; IEEE, Jun. 18–22, 1995).*

Yun, L.C., et al.(Power control for variable QOS on a CDMA channel; IEEE, Oct. 2–5, 1994).*

* cited by examiner

*Primary Examiner*—Guy J. Lamarre
(74) *Attorney, Agent, or Firm*—Whitham, Curtis, & Christofferson, P.C.; Richard A. Henkler

(57) ABSTRACT

A way of dynamically modifying error recovery on a communications controller to operate at the lowest power mode allowed by current error rate conditions. When operating conditions are good and a small number of errors are detected, a low power error detection/correction mode is entered saving battery life. The low power error correction mechanism runs at a slower frequency and lower power than the high power mechanism and maintains the same data rate for the controller, thus saving power. Selecting the controller error (power) mode may be externally, such as by a person using a control dial on a cellular telephone when the voice data gets too noisy. Alternatively, the selection can be automatic, a critical error level detector internally making the selection.

17 Claims, 9 Drawing Sheets

LOW-POWER CRITICAL ERROR RATE COMMUNICATIONS CONTROLLER

BACKGROUND OF THE INVENTION

1. Field of the Invention

The present invention generally relates to communications systems, and more particularly to an apparatus and method for controlling power consumption in electronic device that transmits voice, data, and/or other information in either analog or digital form.

2. Background Description

For integrated circuits (IC) formed in insulated gate complementary field effect transistor (FET) processes, typically referred to as CMOS, power is directly proportional to load capacitance, circuit operating frequency, and the square of the circuit supply voltage. Conventional approaches for reducing power in CMOS IC devices include reducing the circuit operating voltage, using low power circuits such as clock gating circuits, and holding unused logic at a fixed voltage level.

Further, since power is directly proportional to operating frequency, the operating frequency of a circuit is constrained by its intended use. The operating conditions can range from high power data communication networks to low power battery operated cellular phones. Circuits in a battery operated environment, for example, are usually constrained to operate at low power, so that a minimum required battery life will be achieved. However, predicted battery lifetime is based upon average expected use and operating conditions. Further, cellular phones may operate under varied conditions, using various power sources, ranging from a house current AC connection to a battery.

Conventional communications controllers such as those used in cellular phones or other wireless systems are designed for a minimum maintainable transmission bandwidth under worst case conditions, i.e. battery operation. Conventionally, the operating frequency of the controller dictates the error correction and detection algorithms that are necessary. The error rate the controller is intended to tolerate dictates the complexity of the algorithm of the controller, i.e., the higher the error rate, the more complex the algorithm.

The complexity of the algorithm determines the logic necessary for its implementation and, correspondingly, power consumption in the error correction circuitry. For example, a collection of exclusive OR (XOR) gates may be used to generate parity and parity errors may be detected with another group of XOR gates. More rigorous error correction may be realized by resorting to more extensive error checking and correction (ECC) algorithms, which are vastly more complicated and are well known in the art. For an example of ECC, see U.S. Pat. No. 5,434,868 entitled "Fault Tolerant Memory" to Aichelmann, Jr. et al., which is assigned to the assignee of the present invention and incorporated herein by reference.

From the foregoing discussion, it is clear that there is a trade-off among data throughput, power, and error recovery that a communications controller must make. Conventional controllers address this problem by using fixed, single operating point designs, i.e., conventional controllers either use complex, high-speed error correcting algorithms which consume large amounts of power or simpler, slower algorithms which consume much less power.

Neither design is optimum from an efficiency standpoint. For example, at times when power is not critical and/or error rate is low, controllers using complex error correcting algorithms unnecessarily consume power, which substantially shortens battery life. On the other hand, when error rates are high and power is critical, controllers using simple error correcting algorithms are under-powered and thus are unable to sustain an acceptable error rate.

A need therefore exists for a communications controller which can vary its power consumption requirements based on the operating conditions of the device in which it is incorporated, thereby striking an optimum balance between acceptable error rate and power consumption at all times during operation of the device.

SUMMARY OF THE INVENTION

It is an object of the present invention to provide a communications controller which operates in a more efficient manner compared with existing communications controllers.

It is an object of the present invention to accomplish the aforementioned object by providing a communications controller which automatically varies power consumption based on the operating conditions of a device in which it is incorporated, thereby maximizing battery life if the device is battery powered.

It is another object of the present invention to provide a communications controller which varies power consumption by selecting one of a plurality of error correcting algorithms which differ in complexity and thus consume different amounts of power, the selection being made based on an error rate measurement which is continuously updated throughout operation of the device.

It is another object of the invention to vary the power consumption in the above-prescribed manner while maintaining at all times at least a predetermined minimum error rate (e.g., effective signal-to-noise ratio).

It is another object of the present invention to provide a method for controlling the power consumption of an electronic device by automatically selecting an error correction algorithm which is best suited to the operating conditions of the device.

It is another object of the present invention to permit a user to manually control the power consumption of an electronic device incorporating the communications controller of the present invention, specifically by providing a button or dial on the device which, when pushed, automatically causes a different error correcting algorithm to be selected to thereby either improve signal-to-noise ratio at the expense of battery life or save battery life at the expense of a reduced signal-to-noise ratio.

These and other objects of the invention are achieved by providing a communications controller which dynamically selects between at least two error detection and correction circuits in order to maintain an error rate at or below an acceptable error rate. When operating conditions are good (e.g., clear weather, minimum structural interference, etc.) and relatively few errors are detected, a simple, low-power error detection/correction circuit is selected. The low-power error correction circuit operates at a frequency lower than more complex, higher power error correction circuits, but advantageously at substantially the same data error rate, thus saving battery life. When conditions are degraded and/or frequent errors are detected, a more complex, higher-power error correction circuit is selected to maintain the minimum acceptable error rate. Thus, at all times, the invention ensures that a desired minimum acceptable error rate is maintained while simultaneously reducing power consumption requirements during periods where operating conditions are good and few errors are detected.

To further reduce power consumption, the communications controller adjusts one or more controller parameters (e.g., operating frequency, supply voltage, etc.) based on the error detection circuit that is currently selected. In addition, further power savings can be achieved by adjusting the signal strength (power) of a transmitter of the device to the minimum required by current operating conditions.

Alternate embodiments of the invention include mode selection that is manual or in response to control information encoded in transmitted data. Manual error checking/correction mode selection may be done externally, i.e. by a person using a control dial on a cellular telephone when voice data gets too noisy, or internally by a selector comparing critical error level to the actual detected data error rate. Encoded error checking/correction mode selection may be done by including a critical error threshold value in transmitted data for facsimile or e-mail data transmissions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

The present invention is an apparatus and method for controlling power consumption in an electronic device that transmits and receives voice, data, and/or other information in either analog or digital form. Preferably, the apparatus, hereinafter referred to as a communications controller, is incorporated within a cellular phone or a notebook computer, however those skilled in the art can appreciate the invention may be incorporated within other mobile, battery-powered devices such as a pager, Personal Digital Assistants (PDAs), and palm computers with wireless communication capability.

Figure 1:
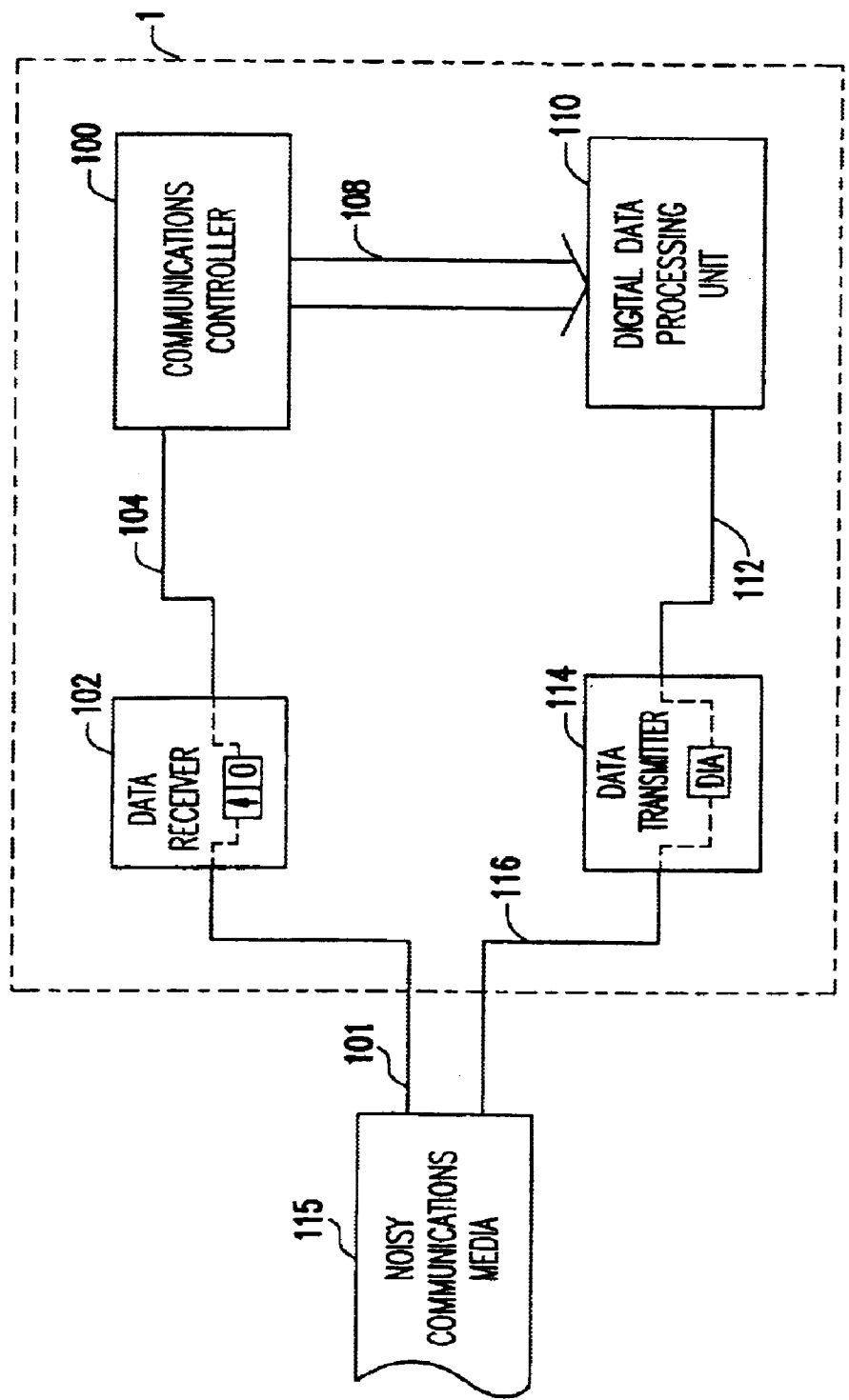
FIG. 1 is a diagram of an electronic device incorporating the communications controller of the present invention.

Referring to FIG. 1, as shown, the communications controller 100 of the present invention may be incorporated within an electronic device 1 which transmits and receives signals to and from a noisy communications media 115. In addition to controller 100, electronic device 1 may include a data receiver 102, a processing circuit 110, and a data transmitter 114.

In operation, an A/D converter in data receiver 102 converts analog signals 101 received from media 115 into digital signals 104. Communications controller 100 then detects and attempts to correct transmission errors in data signals 104 and then inputs corrected data signals and error detection information 108 into a unit 110 for further processing. Processed digital signals 112 from unit 110 are then converted into analog form by a D/A converter in the data transmitter 114 and transmitted along media 115 to a destination. If desired, the device of FIG. 1 may be modified to transmit and receive digital data.

Figure 2:
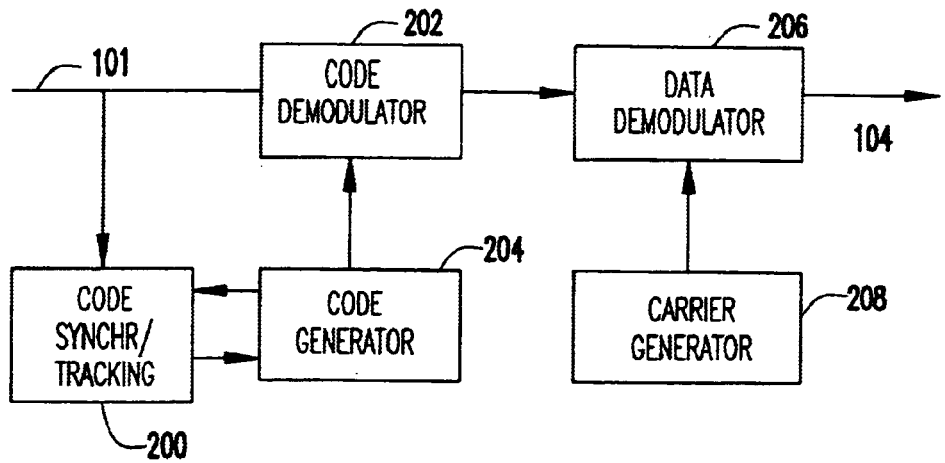
FIG. 2 is a diagram of a preferred configuration for a data receiver included in the electronic device of FIG. 1.

FIG. 2 shows a preferred configuration of data receiver 102, which includes a code synchronization/tracking circuit 200, a code demodulator 202, a code generator 204, a data demodulator 206, and a carrier generator 208. (Although the A/D converter is not shown, it may be incorporated within one of these elements.)

Figure 3:
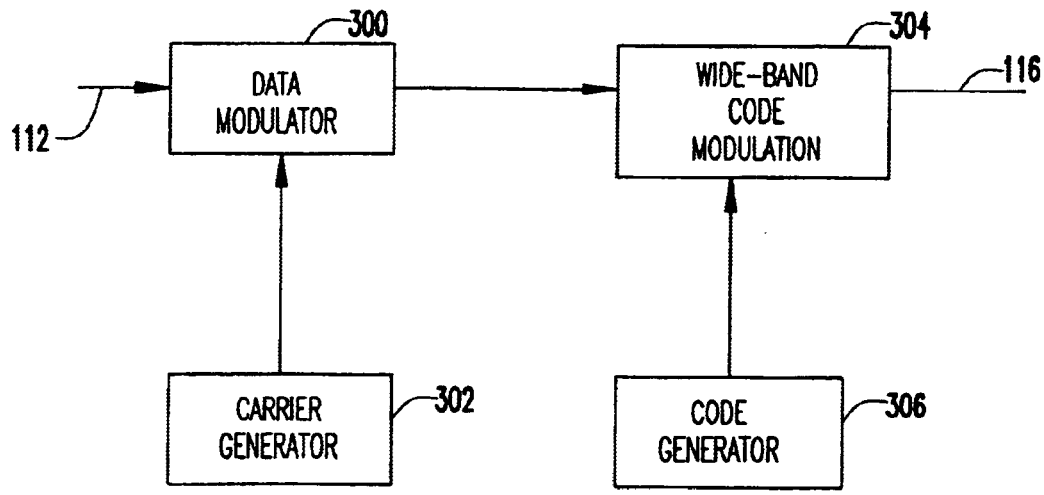
FIG. 3 is a diagram of a preferred configuration for a data transmitter included in the electronic device of FIG. 1.

FIG. 3 shows a preferred configuration of data transmitter 114, which includes a data modulator 300, a carrier generator 302, a wide-band code modulation circuit 304, and a code generator 306. (Although the D/A converter is not shown, it may be incorporated within one of these elements.)

Figure 4:
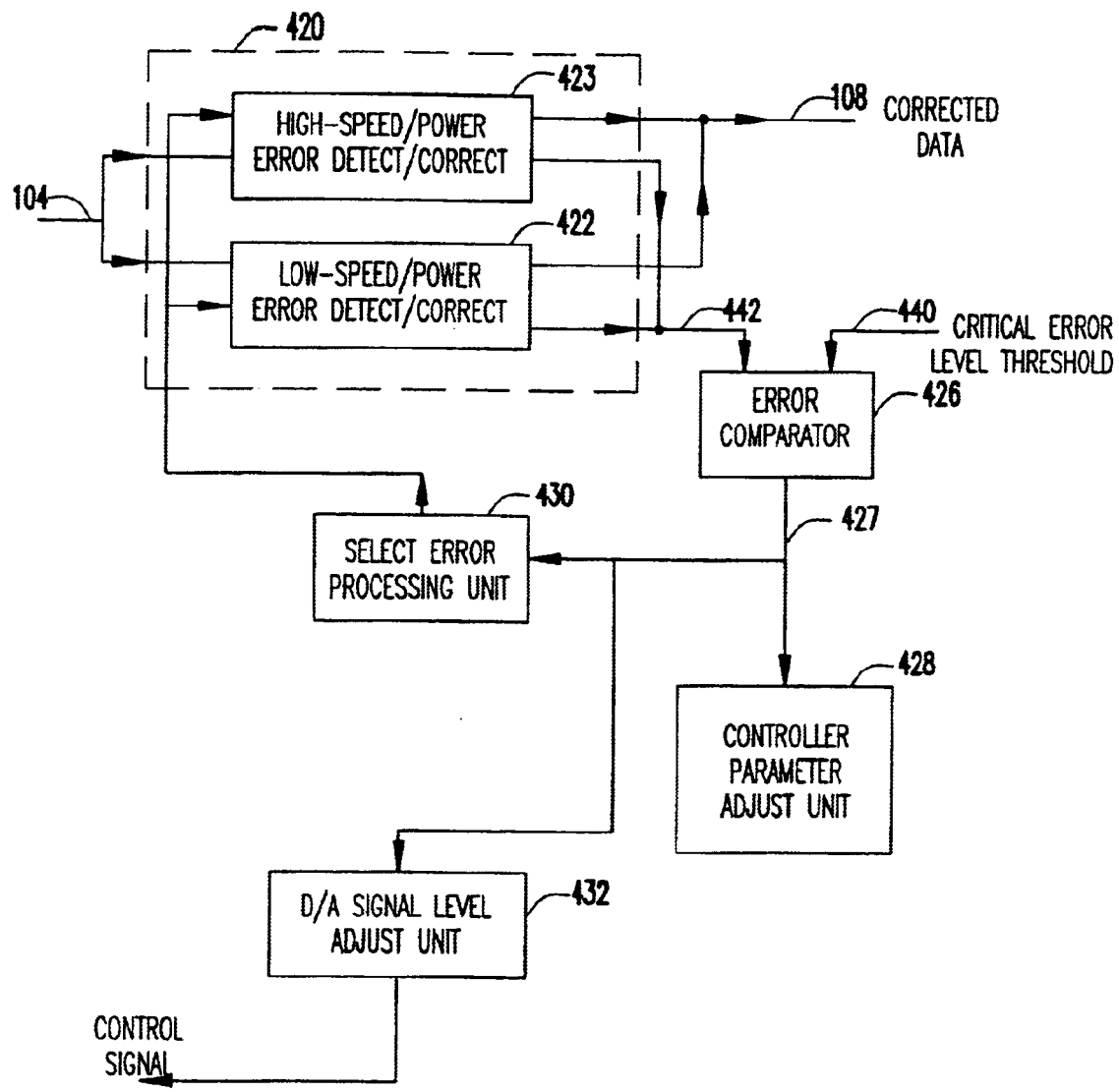
FIG. 4 is a diagram of a first embodiment of the communications controller of the present invention.

Referring to FIG. 4, a first embodiment of the communications controller 100 of the present invention includes an error detection and correction section 420, an error comparator unit 426, a controller parameter adjust unit 428, a select error processing unit 430, and a D/A signal level adjust unit 432.

Error detection and correction section 420 includes two error detection and correction (EDC) circuits, a low-speed/power EDC circuit 422 and a high-speed/power EDC circuit 423. Preferably, EDC circuits 422 and 423 employ different error detection and/or correction techniques with differing degrees of complexity. Consequently, EDC circuits 422 and 423 consume different amounts of power when activated, and are able to maintain data rates proportional to their respective complexities and speeds. By way of example, circuits 422 and 423 may detect and/or correct errors in accordance with any of the following techniques: parity checking, error checking and correction (ECC), hamming, and cyclic redundancy checking (CRC).

Parity checking is a technique which detects errors but does not correct them. ECC, on the other hand, is a technique which not only detects errors but corrects them, at least to a certain extent. ECC techniques may, for example, use Hamming codes to detect multi-bit errors and correct a single bit errors. More sophisticated error correction methods use Forward Error Correction (FEC) codes, common forms of which include Base-Chaudhuri-Hocquenghem (BHC), Golay, and Reed-Muller. Other error-control codes are convolutional codes such as Viterbi and Trellis-Coded Modulation (TCM).

The error detection and/or correction techniques discussed above are merely illustrative in nature, and thus are by no means intended to be a comprehensive listing of those techniques which can be used in accordance with the present invention. Further, while section 420, thus far, has been described as being implemented in hardware, those skilled in the art can appreciate that section 420 may, in the alternative, be equipped with a memory for storing programs which execute the different error correction algorithms discussed above.

Remaining portions of the communications controller include an error comparator unit 426, a controller parameter adjust unit 428, and a select error processing unit 430 which cooperate to automatically select the EDC circuit in section 420 that, at any given time, will consume the lowest amount of power for a given desired minimum error rate.

To achieve these objectives, a previously selected EDC circuit, which, for example, may be a default EDC automatically selected at power up, or one previously selected in accordance with the present invention, inputs a current error rate signal 442 into error comparator unit 426. Comparator unit 426 continuously compares this current error rate to a critical error level threshold 440 and outputs an error level bias signal 427 based on this comparison.

The critical error level threshold corresponds to a desired minium critical error rate, which preferably has been pre-programmed into the controller or the electronic device incorporating the invention. Further, the minimum critical error level threshold is set to ensure that a minimum error rate is maintained in the device at all times.

As previously noted, the comparison performed in the error comparator unit 426 determines which EDC in section 420 should be selected. If the current error level 442 is below the critical error level threshold 440, then relatively few errors are being detected in the input data 104. In this instance, the error comparator unit. 426 sends an error level bias signal 427 to the select error processing unit 430 to cause unit 430 to select the less-complex, low-speed/power EDC circuit 422.

The controller of the present invention, thus, is particularly advantageous for use in portable devices such as cell phones, notebook computers, and pagers, since the controller automatically reduces power consumption (i.e., saves battery life) when a high-power, complex EDC is not required in order to maintain a desired level of signal-to-noise ratio.

To further reduce power consumption, the error level bias signal 427 may also be input into controller parameter adjust unit 428 to cause unit 428 to adjust controller parameters including one or more of: a device threshold voltage ($V_t$), circuit supply voltage ($V_{dd}$), clock frequency, and signal strength. For example, this adjustment may include raising the threshold voltage $V_t$, lowering the circuit supply voltage $V_{dd}$, slowing the operating frequency, and reducing output signal strength.

To reduce power consumption to an even greater degree, error level bias signal 427 may also be input into D/A signal level adjust unit 432, which in response, outputs a control signal to data transmitter 114 to adjust (e.g., reduce) the output signal level. If the error rate is zero, or very low, the transmitter and receiver are probably close in range and thus transmission power (e.g., signal strength) can be reduced. The other side of the communication may then be notified so that it can lower its power accordingly. Further, in each of the controller parameter adjust unit 428, select error processing unit 430, and D/A signal level adjust unit 432, selection may be performed by incrementing or decrementing an up/down counter which selects the appropriate EDC circuit, parameters, and/or voltage level.

If the current error level 442 is above the critical error level threshold 440, then a large number of errors are being detected in the input data 104. Under these circumstances, the error level bias signal 427 of a second type is sent from comparator unit 426 to select error processing unit 430 to cause unit 430 to select the more complex, high-speed/power EDC circuit 423. Thus, in this instance, the need to maintain a desired minimum error rate level and thus an acceptable signal-to-noise ratio necessitates the selection of the higher power EDC circuit, at the expense of increased power consumption.

To further improve signal-to-noise ratio, error level bias signal 427 may also be input into controller parameter adjust 428 to adjust one or more of the previously mentioned controller parameters, e.g., device threshold voltage ($V_t$), circuit supply voltage ($V_{dd}$), clock frequency, and signal strength, to reduce error rate, at the expense of increasing power consumption. The signal-to-noise ratio, for example, may be raised (or improved) by lowering the threshold voltage $V_t$, raising the circuit supply voltage $V_{dd}$, increasing operating frequency, and/or increasing output signal strength.

To improve signal-to-noise ratio to an even greater degree, error level bias signal 427 may also be input into D/A signal level adjust unit 432 to cause unit 432 to adjust the output signal level of the device, thereby reducing transmission error rate at the expense of higher power operation.

From the above, it is evident that the first embodiment of the communications controller of the present invention optimizes operational efficiency by balancing signal-to-noise ratio and power consumption in such a manner that a desired minimum error level is maintained at all times.

Figure 5:
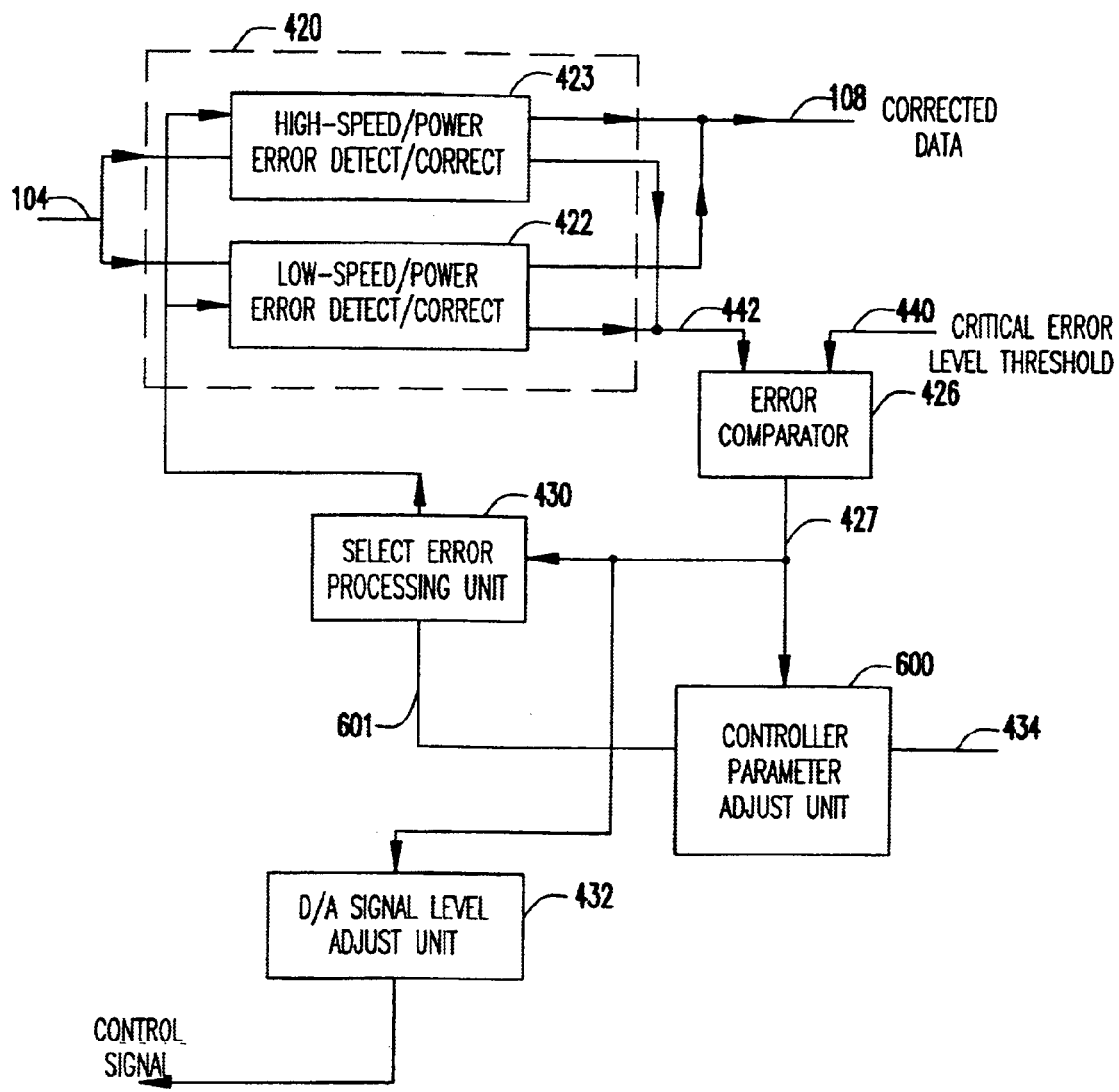
FIG. 5 is a diagram of a second embodiment of the communications controller of the present invention.

Referring to FIG. 5, in a second embodiment of the communications controller of the present invention includes a controller parameter adjust unit 600 adapted to receive an external signal 434 for controlling selection of EDC circuits 422 and 423. When unit 600 receives signal 434, unit 600 inputs a control signal 601 into select error processing unit 430, which in response selects the EDC circuit specified by the signal.

If required, external signal 434 may also affect an adjustment of one or more of controller parameters $V_{dd}$, $V_t$, and clock frequency. For example, depending on the EDC method selected by signal 434, the parameters of $V_{dd}$, $V_T$, and frequency may need to be adjusted in order for the EDC method to work. The higher EDC method, for instance, may need to operate at a higher frequency than the lower EDC. In order to operate at a higher frequency, $V_{dd}$ may need to be raised. This steps are preferably pre-programmed into controller parameter adjust unit 600.

Preferably, external signal 434 is generated by a user pushing a power mode button or control dial on the electronic device incorporating the communications controller of the invention. Through this button or dial, a user is advantageously permitted to manually select the EDC technique to be employed. The second embodiment of the controller, thus, is particularly useful for cellular phones, such that when a call gets too noisy, the user can push the power mode button on the phone to cause a specific EDC (e.g., the next highest EDC) to be selected with improved error correction complexity. Alternatively, if desired, the power mode button may be used to shift to a lower-complexity EDC to save battery life. The second embodiment of the invention, thus, allows a user to manually control: whether power consumption (e.g., battery life) should be sacrificed in favor of improved signal-to-noise ratio, e.g., a clearer call.

Figure 6:
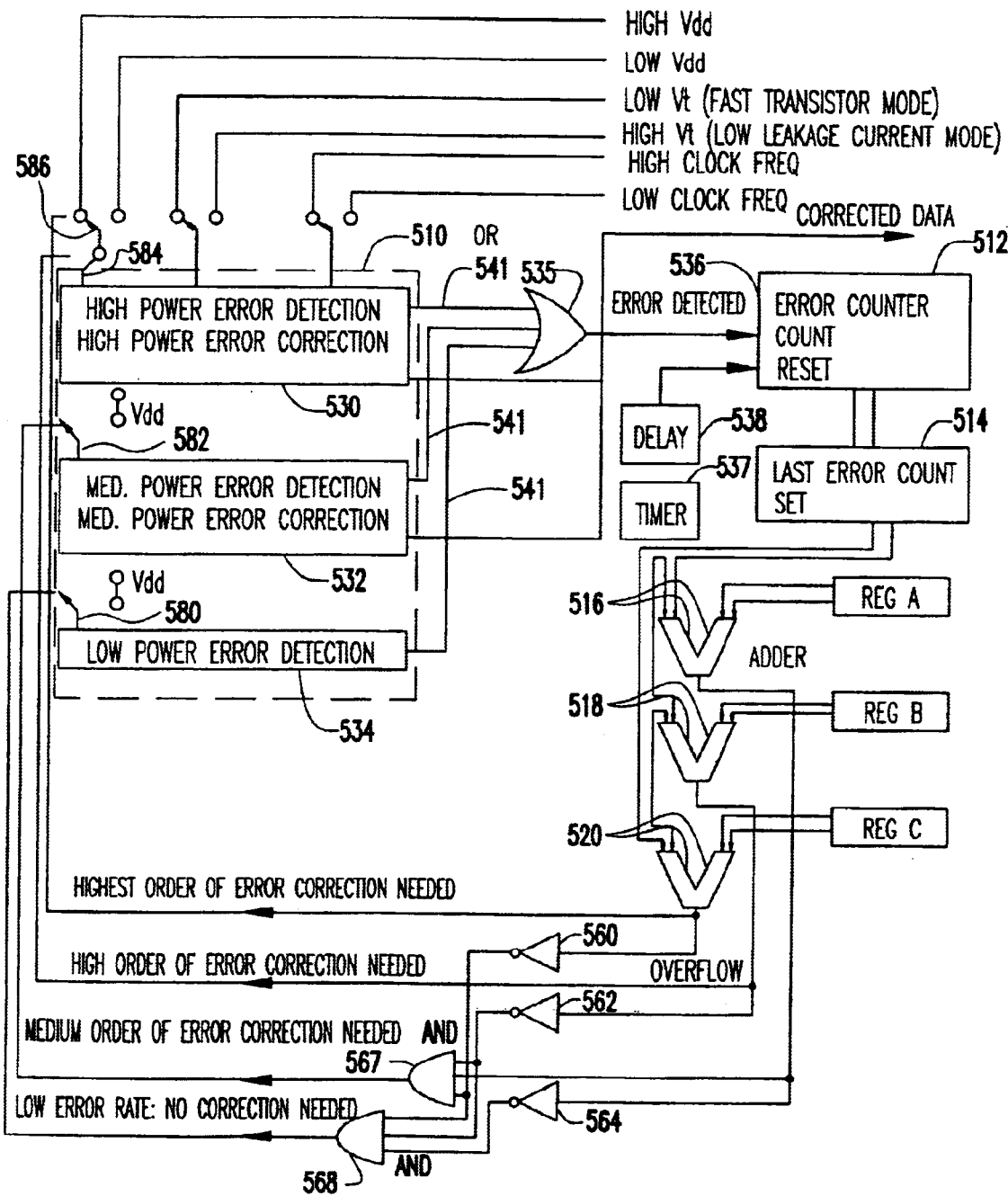
FIG. 6 is a diagram of a third embodiment of a communications controller of the present invention.

FIG. 6 shows a third embodiment of the communications controller 500 of the present invention in the case where more than two EDC circuits are used to detect and correct input data errors. As shown, communication controller 500 includes an EDC section 510, an error counter 512, a last error register 514, a plurality of adder circuits 516, 518, 520. The EDC section 510 contains three EDC circuits, a high-power EDC circuit 530, a medium-power EDC circuit 532, and a low-power EDC circuit 534.

The adders may be used to add a current error with a pre-set value in a register and utilizing the overflow bit of the adder to indicate that the count is higher than that in the register. For example, assume that a maximum value for the adders is 256 (8 bits). If the first adder is to detect error counts of more than 20 errors, register A would be set to 256−20=236. Under these circumstances, if 21 errors are detetected, and 21 is added to 236, the result is an overflow of the adder. This operation is akin to a comparator, and if desired, comparators may be used.

In operation, EDC circuits 530 and 532 each output two signals. The first signal is indicative of a number of errors detected by an error detection section of the EDC, and the second signal corresponds to corrected data (e.g., data 108) output from an error correction section of the EDC. EDC circuit 534 is unable to correct errors, and thus contains a single output indicating error detection. Signal lines 541 connecting the error detection section of each EDC are input into an OR gate 535, and the result of this logical OR operation is input into error counter 512. Since only one EDC is selected at any given time, only one of the signal lines will contain detected error information.

Error counter 512 receives the detected error information output from OR gate 535 via a count input 536 terminal. The last error register 514 then comes into play. Register 514 stores the last error count for the period of the timer, to present a stable error count to the error comparators/adders. In accordance with register 514, the number of errors are counted over a predetermined time period, as determined by timer 537, and when this period expires timer 537 outputs a signal for resetting error counter 512 through a delay 538 and for capturing data into the last error register 514.

Figure 7:
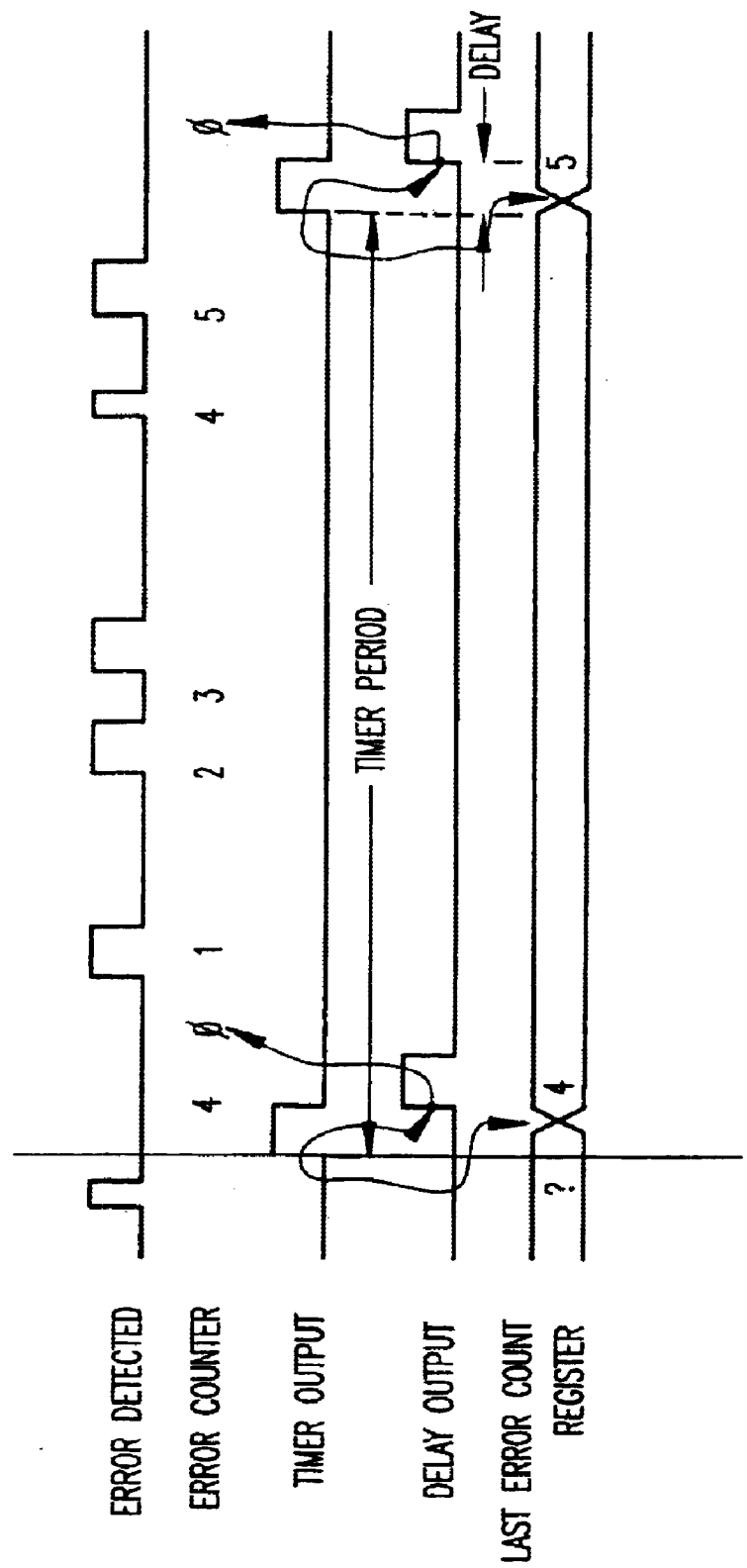
FIG. 7 is a timing diagram showing operation of the last error register and timer in accordance with, for example, the third embodiment of the present invention.

Referring to FIG. 7, timing diagrams are provided for showing how last error register 514 and timer 537 cooperate in this manner. Specifically, when the timer expires, the timer output goes high for a few nanoseconds. This causes two operations to be performed. In the first operation, the current value of the error counter is captured into register 514 and called the "last error count." The register 514 will hold this value until the timer expires again. In the second operation, when the timer output goes high and after a delay, the error counter 512 is reset to zero. The delay is needed to ensure that sufficient time exists to capture the counter value into register 514 before the counter is reset to zero. The value of the timer period is application dependent, but typically may be on the order of milliseconds.

Once the number of errors detected during the time period has been determined, last error register 514 outputs a current error count (or rate) to each of adders 516, 518, and 520. These adders compare the current error count to respective predetermined error level threshold values stored in registers A, B, and C, and based on these comparisons, control signals are output to select the EDC circuit that will consume the lowest amount of power while still allowing a predetermined minimum critical error rate to be maintained. Moreover, like the first embodiment, the output of the adder circuits may also be used to adjust one or more controller parameters, e.g., device threshold voltage ($V_t$), circuit supply voltage ($V_{dd}$), clock frequency, and signal strength.

Returning to FIG. 6, a plurality of logic circuits including inverter circuits 560, 562, and 564 and AND gates 567 and 568 are provided to generate the control signals for selecting the EDC circuits and controller parameters. These control signals are generated based on comparisons performed between the current error count (or rate) as output from last error register 514 and the three predetermined threshold values stored in registers A, B, and C. As will become apparent from the discussion below, these threshold values are selected to define the conditions under which the EDC circuits are to be selected in view of the current detected error count.

A variety of factors may be used to drive the selection of the threshold values. One factor may be tolerance for errors. If any error is unacceptable, for example, the threshold for switching from a low EDC, such as parity checking, to a higher EDC may be set to 1, since the parity checking technique cannot correct errors but only detect them. If, on the other hand, errors can be handled, without correcting them, for example, by requesting a re-transmission of the error data, as long as this does not occur frequently, the threshold may still be set to a number that reflects the maximum number of errors that can be corrected by retransmission in the timer period, without affecting required communications bandwidth. This is domain specific and would vary depending on the type of data being transmitted.

The threshold values also may be dynamically controlled by the controller processor, based on the type of communication being performed. If, for example, a voice communications on a hand-held palm top is changed to sending and receiving data, which requires fast, error-free communications, the controller may set the thresholds so as to immediately switch to the highest EDC on a first error.

Another criteria for setting thresholds takes into consideration the capability of each EDC. For example, Hamming codes may be sufficient to handle all single bit errors, but may not adequately correct multi-bit errors. The Hamming code threshold, thus, may be set to 1. Similarly, for other EDC techniques, the threshold may be set in accordance with their attributes.

The thresholds may be applied in the following manner to control selection of an appropriate EDC. In the case where the current error rate is lower than the threshold values in all three registers, the low-power EDC circuit is selected. Under these circumstances, each adder outputs a logical "0" which is inverted by a respective inverter circuit to cause AND gate 568 to output a logical "1" to a switching circuit 580 connected to low-power EDC circuit 534. In response to this logical "1" signal, switching circuit 580 connects EDC circuit 534 to supply voltage $V_{dd}$, thereby causing the low-power EDC to be selected.

At this time, medium- and high-power EDC circuits 530 and 532 remain unselected and thus are left in an inactive state. Specifically, the logical "0" output of the adder circuit 516 is directly input into AND gate 567, the result of which is to cause AND gate 567 to send a logical "0" to a switching circuit 582 which then disconnects the medium-power EDC 532 from supply voltage $V_{dd}$, thereby placing the medium-power EDC in an inactive state.

Similarly, the logical "0" output from adder circuit 518 is directly input into a switching circuit 584 connected to the high-power EDC circuit 530. In response to this logical "0" value, switching circuit 584 disconnects the high-power EDC from the supply voltage $V_{dd}$, thereby placing the high-power EDC in an inactive state.

When the current error rate is higher than the threshold value in register A but lower than the threshold values in registers B and C, the medium-power EDC circuit 532 is selected in the following manner.

A logical "1" is output from adder 516 and a logical "1" is output from adders 518 and 520. Inverter circuits 562 and 560 then invert the logical "0" values from adders 518 and 520, to thereby cause all three inputs into AND circuit 567 to be a logical "1". This logical "1" causes switching circuit 582 to connect the medium-power EDC to supply voltage $V_{dd}$, thereby causing the medium-power EDC to be selected.

The low-power and high-power EDC circuits 534 and 530, however, are not selected. The logical "1" output from the adder 516 is inverted by inverter 564 to thereby cause AND gate 568 to output a logical "0". This logical "0" value causes switching circuit 580 to disconnect the low-power EDC circuit from the supply voltage $V_{dd}$, thereby placing the low-power EDC circuit in an inactive state. Further, a logical "0" output from the adder 518 is directly input into switching circuit 584, which in response disconnects the high-power EDC from a supply voltage $V_{dd}$ to thereby place the high-power EDC in an inactive state.

When the current error rate is higher than the threshold values in registers A and B but lower than the threshold value in register C, the high-power EDC is selected in the following manner.

A logical "1" output from adder 516 is inverted by inverter 564 to cause a logical "0" to be input into the AND gate 568. A logical "1" output from adder 518 is then inverted by inverter 562 to cause logical "0" values to be input into AND gates 567 and 568. As a result, both AND gates output logical "0" values which respectively place the low-power and medium-power EDCs in an inactive state.

On the other hand, the logical "1" output from adder 518 is directly input into the high-power EDC, thereby causing the high-power EDC to be selected. Under these same circumstances, a logical "0" output from adder 518 causes switching circuit 584 to input low value of supply voltage $V_{dd}$, high value of voltage $V_t$, and a lower clock frequency into the high-power EDC.

These lower values are useful in the following sense. Under the circumstances, the best EDC technique may not be able to keep up with the amount of errors detected at the current operating frequency. Thus, if the circuit is operated at a higher frequency, it can maintain the required data through-put and correct the errors. In order to run at a higher frequency, however, $V_{dd}$ must be raised and $V_t$ lowered. Correspondingly, if operation can be sustained at the lower frequency, lower frequency and $V_{dd}$ values can be used, to thereby save power.

When the current error rate is higher than the threshold values in all three registers A, B, and C, the high-power EDC is once again selected but higher values of $V_{dd}$, $V_t$, and clock frequency are input into the high-power EDC. Under these circumstances, adder 520 outputs a logical "1" value which is input into switching circuit 586, which in turn causes a high value of $V_{dd}$, low value of $V_t$, and a higher clock frequency to be input into the high-power EDC, thereby invoking the highest order of correction possible.

From the foregoing, it is apparent that the third embodiment of the present invention balances signal-to-noise ratio and power consumption in such a manner as to select the EDC technique which consumes the lowest power based on current detected error rates. Through this selection, the present invention optimizes battery life while simultaneously maintaining at least a minimum acceptable signal-to-noise ratio.

Modifications to the third embodiment discussed above will be apparent to those skilled in the art. For example, while section 510 only shows three EDC circuits, one skilled in the art can appreciate that more than three EDC circuits/techniques may be employed to control power consumption.

Figure 8:
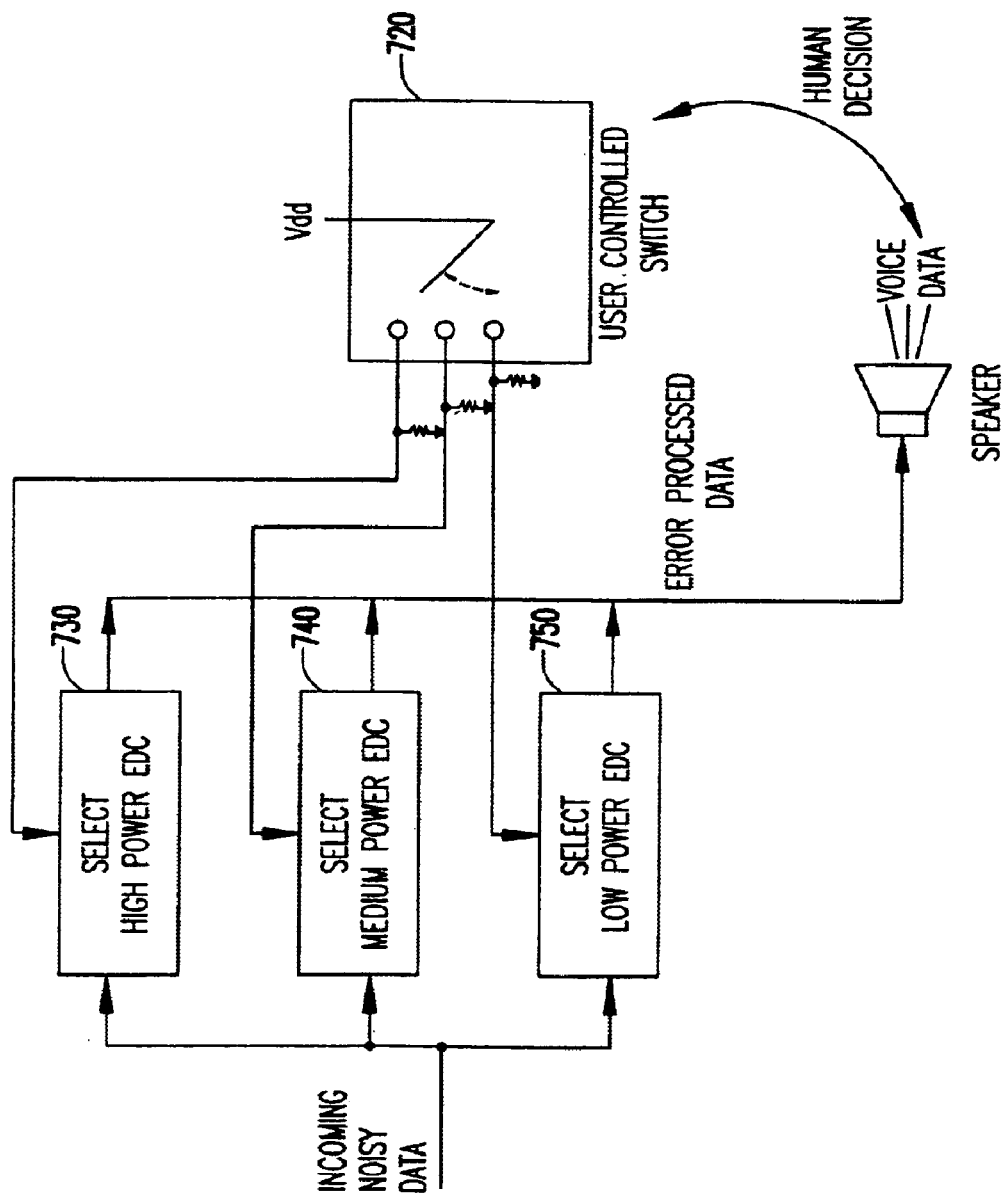
FIG. 8 is a diagram of a fourth embodiment of the communications controller of the present invention.

FIG. 8 shows a fourth embodiment of the communications controller 700 of the present invention adapted to receive an external signal for allowing a user to manually select one of EDC circuits 730, 740, and 750 in order to raise signal-to-noise ratio and thus improve the clarity of a call. The external signal is received by a user-controlled switch unit 720, which upon receipt of the external signal, causes voltage $V_{dd}$ to be connected to one of high power EDC 730, medium power EDC 740, and lower power EDC 750. If desired, switching in unit 720 may be sequential. Further, by manipulating unit 720, a user can advantageously trade off improved signal-to-noise ratio for battery life, or vice versa, at will.

Figure 9:
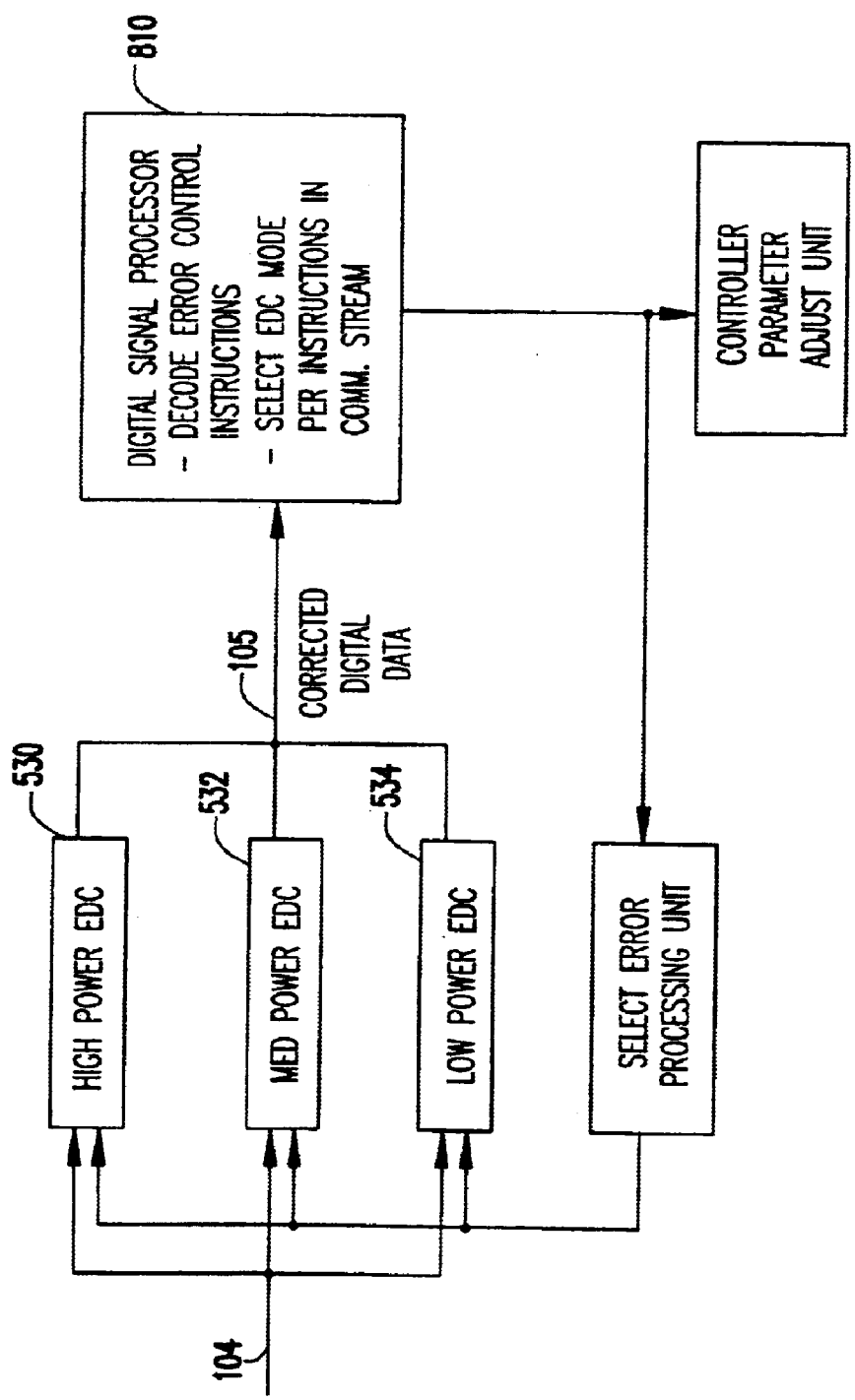
FIG. 9 is a diagram of a fifth embodiment of the communications controller of the present invention.

In a fifth embodiment of the invention, shown in FIG. 9, EDC circuit selection error checking/correction mode selection is remotely performed. In accordance with this embodiment, the signal for selecting an EDC 530, 532, 534 and/or for setting the critical error threshold value is transmitted as part of the data received by the electronic device. Preferably, this signal is in the form of initialization or control bits which are encoded into the transmission data.

As shown, a digital signal processor 810 decodes the control bits from the received data and automatically selects an EDC in accordance with the control bits. The control bits, for example, may designate a specific EDC or may cause the next highest or next lowest EDC to be selected. According to the fifth embodiment, therefore, power consumption and signal-to-noise ratio may be remotely controlled. As such, the fifth embodiment would be suitable for other types of data communication such as facsimile (fax) or e-mail data, and in this regard may require an override capability to turn off or force the EDC algorithm control towards high speed and high data quality.

Figure 10:
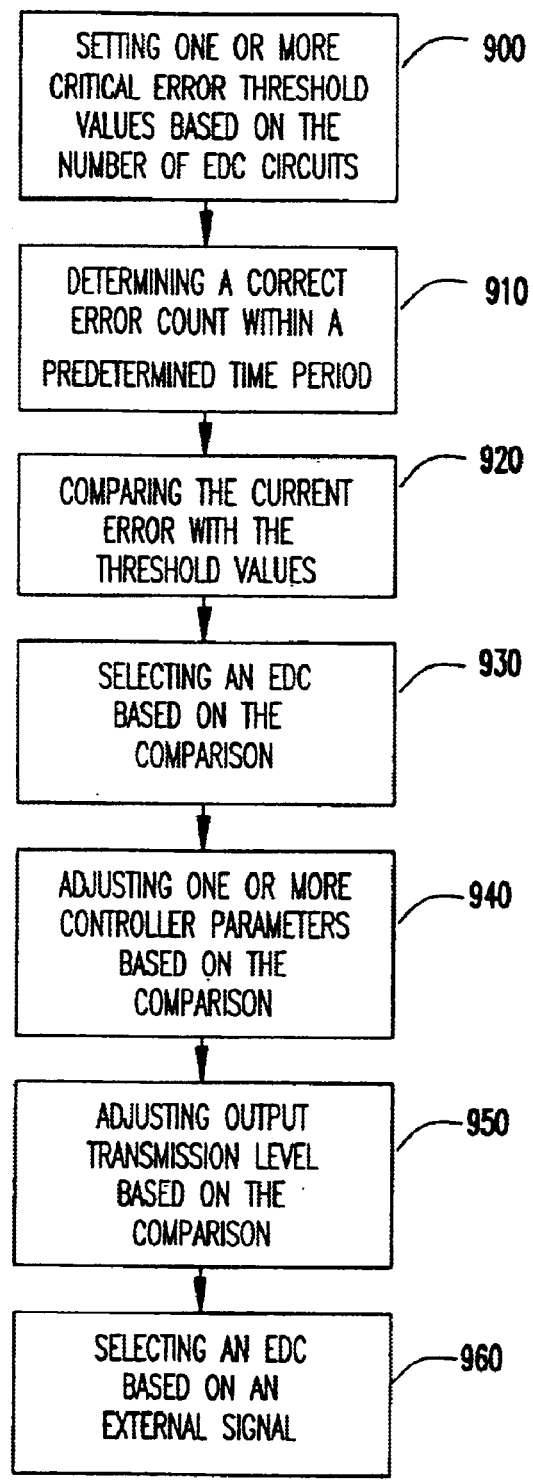
FIG. 10 is a flow chart showing steps included in the method of the present invention.

FIG. 10 is a block diagram showing steps included in the method of the present invention for automatically controlling power consumption in an electronic device. As shown, a first step of the method includes setting a number of critical error threshold values equal to a number of EDC circuits included in the device to be controlled. (Block 900).

A second step of the method includes determining a current error count within a predetermined time period (i.e., an error rate) as determined by a previously selected EDC circuit, which may be a default EDC automatically selected at power up. (Block 910).

A third step of the method includes comparing the current error count with the threshold value(s) to derive an error level bias signal. If only two EDCs are used, these steps are performed in accordance with the first embodiment of the invention explained above. If three or more EDCs are used, these steps are performed in accordance with the third embodiment of the invention explained above. (Block 920).

A fourth step of the method includes selecting an EDC based on the comparison performed in the third step. Again, for two EDCs, this step is performed in accordance with the first embodiment and for three or more EDCs in accordance with the third embodiment. (Block 930).

Optional steps of the present method include adjusting one or more controller parameters (Block 940) and/or an output transmission level (Block 950) based on the error level bias signal generated in the third step, and selecting an EDC circuit based on an external signal (Block 960), for example, in accordance with the second and fourth embodiments discussed above.

Other modifications and variations of the invention will be apparent to those skilled in the art from the foregoing disclosure. Thus, while only certain embodiments of the invention have been specifically discussed herein, it will be apparent that numerous modifications may be made thereto without departing from the spirit and scope of the invention.

We claim:

1. A method for controlling power consumption in an electronic device, said device including a data receiver, a data transmitter, and means for performing a plurality of error detection and/or correction techniques at said receiver, said method comprising:

receiving data having a given error detection and correction coding;

determining an error rate corresponding to said data received in said receiving step, said error rate being determined by an initial one of said plurality of error detection and/or correction techniques;

comparing said error rate to at least one error threshold value; and selecting, at said receiver, one of said plurality of error detection and/or correction techniques, based on an outcome of said comparing step, having a sufficiently complex and rigorous error detecting and/or correcting algorithm which, when applied to said data having said given error detection and correction coding, will ensure that said selected error detection and/or correction technique is one which consumes a lowest amount of power while maintaining a desired signal-to-noise ratio.

2. The method of claim 1, wherein if said error rate is below said error threshold value, said selecting step includes:

selecting an error detection and/or correction technique which is less complex and consumes less power than said initial error detection and/or correction circuit.

3. The method of claim 1, wherein if said error rate exceeds said error threshold value, said selecting step includes:

selecting an error detection and/or correction technique which is more complex and consumes more power than said initial error detection and/or correction circuit.

4. The method of claim 1, further comprising:

adjusting at least one controller operating parameter to support performance of said selected error detection and/or correction technique.

5. The method of claim 1, further comprising:

adjusting an output signal level of said data transmitter in accordance with an outcome of said comparing step.

6. The method of claim 1, further comprising:

receiving an external signal from a user; and selecting one of said plurality of error detection and/or correction technique in accordance with said external signal.

7. The method of claim 6, wherein said external signal causes an error detection and/or correction technique having a higher complexity and power consumption level than said initial error detection and/or correct technique, said external signal thereby improving signal-to-noise ratio at an expense of increased power consumption.

8. The method of claim 6, wherein said external signal causes an error detection and/or correction technique having a lower complexity and power consumption level than said initial error detection and/or correct technique, said external signal thereby improving power consumption at an expense of a lower signal-to-noise ratio.

9. The method of claim 1, wherein said plurality of error detection and/or correction techniques is at least three, and wherein said comparing step includes:

comparing said error rate to a first error threshold value, and if said error rate is less than said first error rate, selecting an error detection and/or correction technique of low complexity and power consumption requirements;

if said error rate is greater than said first error rate but lower than a second error threshold value, selecting an error detection and/or correct technique of medium complexity and power consumption requirements; and if said error rate is greater than said second error threshold value, selecting an error detection and/or correction technique of high complexity and power consumption requirements.

10. A method for controlling power consumption in an electronic device, said device including a data receiver, a data transmitter, and means for performing a plurality of error detection and/or correction techniques at said receiver, said method comprising:

receiving data having a given error detection and correction coding;

receiving an external manually entered signal from a user; and selecting, at said receiver, one of a plurality of error detection and/or correction techniques in accordance with said external signal, said plurality of error detection and/or correction techniques consuming different levels of power and having different levels of complexity which, when applied to said data having said given error detection and correction coding produce different rates of error correction;

wherein said external signal causes selection of an error detection and/or correction technique which is one of the following:

an error detection and/or correction technique having a higher complexity and power consumption level than a currently selected error detection and/or correct technique, said external signal thereby improving signal-to-noise ratio at an expense of increased power consumption; and an error detection and/or correction technique having a lower complexity and power consumption level than said currently selected error detection and/or correct technique, said external signal thereby improving power consumption at an expense of a lower signal-to-noise ratio.

11. A method for controlling power consumption in an electronic device, said device including a data receiver, a data transmitter, and means for performing a plurality of error detection and/or correction techniques at said receiver, said method comprising:

receiving a data signal having a given error detection and correction coding at said data receiver from said data transmitter, said data signal containing information for selecting one of a plurality of error detection and/or correction techniques to be performed in said electronic device, decoding said data signal to derive a select signal; and selecting, at said receiver, said one of said plurality of error detection and/or correction techniques, each of which, when applied to said data signal having a given error detection and correction coding, produces a different error correction and power consumption from other error detection and/or correction techniques of said plurality of said error detection and/or correction techniques, in accordance with said select signal.

12. A communications controller for an electronic device, said communications controller comprising:

a plurality of error detection and/or correction circuits each capable of performing a different technique for detecting and/or correcting errors on incoming data having a given error detection and correction coding, a selected one of said error detection circuits determining an error rate for said incoming data having said given error detection and correction coding which is different from another of said error detection and/or correction circuits of said plurality of error detection and/or correction circuits;

an error comparator for comparing said error rate to an error threshold value, wherein said error threshold value corresponds to an error rate which will ensure that said selected error detection and/or correction circuit is one which consumes a lowest amount of power while maintaining a desired signal-to-noise ratio;

a select unit which generates a signal for selecting one of said error detection circuits based on an outcome of the comparison performed by the error comparator; and means for selecting one of said plurality of error detection circuits based on the select signal generated by said select unit.

13. The controller of claim 12, further comprising:

means for adjusting at least one controller operating parameter to enable operation of said selected error detection and/or correction circuit.

14. The system of claim 12, further comprising:

means for adjusting an output signal strength of said electronic device in accordance with the select signal.

15. The system of claim 12, further comprising:

means for receiving an external signal initiated by a user, said selecting means selecting one of said plurality of error detection and/or correction circuits based on said external signal.

16. A communications controller for an electronic device, said communications controller comprising:

means for receiving an external manually entered signal from a user;

a plurality of error detection and/or correction circuits having differing degrees of error detection and/or correction complexity and which consume different amounts of power which, when applied to a data signal having a given error detection and correction coding, provide different levels of error detection and/or correction and power consumption compared to others of said plurality of error detection and/or correction circuits; and means for selecting one of said plurality of error detection and/or correction circuits in accordance with said external signal, wherein said external signal causes an error detection and/or correction circuit is one of the following:

an error detection and/or correction circuit having a higher complexity and power consumption level than a currently selected error detection and/or correct circuit, said external signal thereby improving signal-to-noise ratio at an expense of increased power consumption; and an error detection and/or correction circuit having a lower complexity and power consumption level than said currently selected error detection and/or correct circuit, said external signal thereby improving power consumption at an expense of a lower signal-to-noise ratio.

17. A communications controller for an electronic device, said communications controller comprising:

a plurality of error detection and/or correct circuits;

means for receiving a data signal containing information for selecting one of said plurality of error detection and/or correction circuits;

means for decoding said data signal to derive from said information a select signal; and means for selecting said one of said plurality of error detection and/or correction circuits in accordance with said select signal.

* * * * *